April 21, 1925.  1,534,907

J. P. BROECKER

COMBINATION IMPLEMENT

Filed Aug. 25, 1924

John P. Broecker
INVENTOR

BY Victor J. Evans
ATTORNEY

WITNESS:

Patented Apr. 21, 1925.

1,534,907

UNITED STATES PATENT OFFICE.

JOHN P. BROECKER, OF MILWAUKEE, WISCONSIN.

COMBINATION IMPLEMENT.

Application filed August 25, 1924. Serial No. 734,100.

*To all whom it may concern:*

Be it known that I, JOHN P. BROECKER, a citizen of the United States, residing at Milwaukee, in the county of Milwaukee and State of Wisconsin, have invented new and useful Improvements in Combination Implements, of which the following is a specification.

This invention relates to improvements in rolling pins, one object of the invention being to provide means whereby the pin will be caused to roll the dough to a certain thickness.

Another object of the invention is to make such means interchangeable so that the dough can be rolled to any desired thickness by using the proper sized attachment.

A further object of the invention is to provide means for placing cutters on the pin to cut the dough into strips or blocks.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
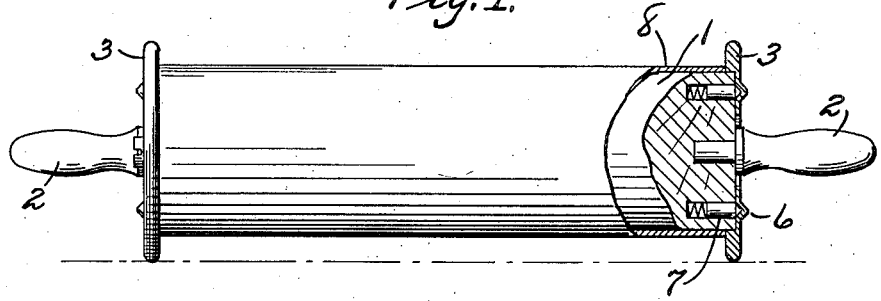
Figure 1 is an elevation with parts broken away to show the means for rolling the dough to a certain thickness.

In these views, 1 indicates the body of the pin and 2 the handles thereof. In carrying out my invention I provide a pair of discs 3 which are adapted to be placed on the ends of the pin and as these rings are of greater diameter than the body they will support the body in spaced relation from the board or surface upon which the dough has been rolled. Thus the dough can be rolled to a thickness, the thickness of dough being equal to the space between the board and the body of the pin. By using discs of different diameters the dough can be rolled to the required thickness. The discs are provided with slots 4 for engaging the pins or screws 5 placed in the ends of the pin so that the discs are detachably connected with the pin. The discs are also provided with depressions 6 which are engaged by spring pressed pins 7 placed in the ends of the rolling pin. These pins will act to prevent turning movement of the discs on the body which might cause them to drop off the screws. I may also place a sleeve 8 on the body which is held in place by the discs, as shown in Figure 1.

Figure 2:
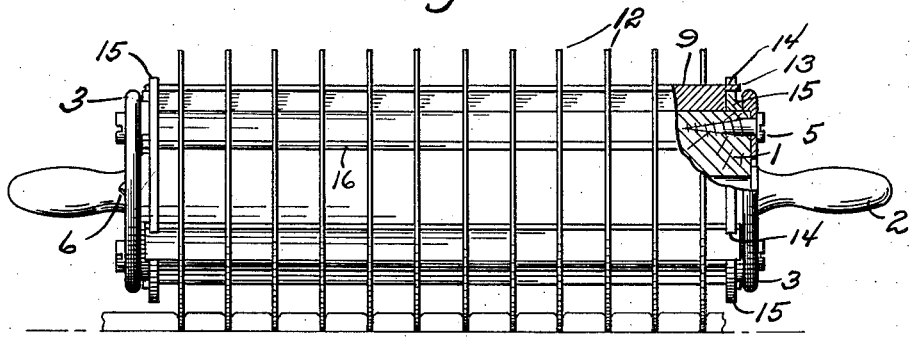
Figure 2 is a similar view but showing the cutting means in position.
Figure 3:
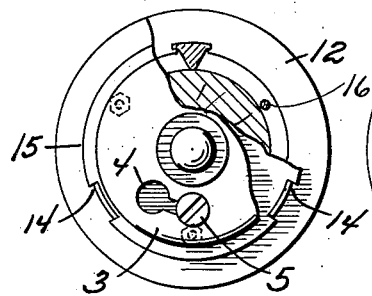
Figure 3 is an end view, with parts broken away, showing the cutting means.
Figure 4:
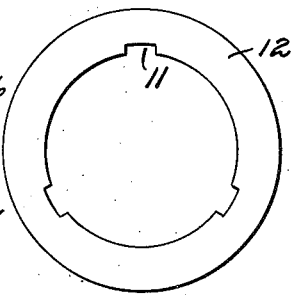
Figure 4 is a view of one of the cutting knives.
Figure 5:
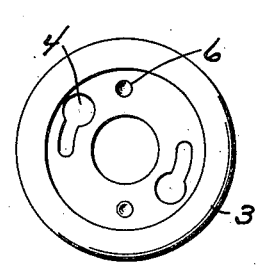
Figure 5 is a view of one of the end discs.
Figure 6:
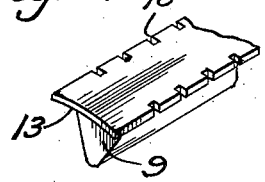
Figure 6 is a fragmentary perspective view of one of the holding bars for the cutting knives.

I also provide means for cutting the dough into strips or blocks after it has been rolled and such means are carried by the pin. These means consist of ring cutters 12 which are carried by substantially triangular shaped bars 9 having notches 10 therein for engaging notches 11 formed in the ring cutters 12. The extensions 13 at the ends of the bars 9 engage notches 14 formed in the end rings 15 which encircle the ends of the body of the pin and are held in place by the discs 3, as shown in Figure 2. As will be seen the rings 15 hold the bars 9 in spaced relation around the roller. By removing the cutter assembly from the roller and removing one of the rings 15 to permit the bars 9 to be moved towards each other the ring cutters can be moved to occupy other notches 10 in the bars and the number of cutters increased or diminished to make the device cut the dough as desired after the parts are again assembled on the roller. Thus the cutting rings can be adjusted to cut the dough into strips of the desired width or by placing the rings in pairs the dough can be cut into blocks by first running the cutter device one way of the dough and then the opposite way so that the strips can be removed and thus leave the dough in rectangular shaped blocks.

From the foregoing it will be seen that I have provided simple and effective means for rolling dough to any desired thickness and for cutting the dough into strips or blocks.

I may also provide binder rods 16 for holding the rings 15 together.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a rolling pin, a plurality of ring-shaped cutters, longitudinally extending bars passing through the cutters and having notches therein for engaging parts of the cutters, a pair of rings engaging the ends of the bars for holding the same in engagement with the cutters and discs detachably connected with the ends of the rounded pin and engaging the rings for holding the cutter assembly on the pin.

In testimony whereof I affix my signature.

JOHN P. BROECKER.